United States Patent [19]

Reinke et al.

[11] 3,918,068

[45] Nov. 4, 1975

[54] DISTORTION CORRECTION APPARATUS FOR ELECTRO-OPTICAL REFLECTORS WHICH SCAN BEAMS TO PRODUCE IMAGES

[75] Inventors: Robert V. Reinke, Penfield; John E. Newton, Rochester; Robert L. Reifsteck, Rochester, all of N.Y.

[73] Assignee: Eastman Kodak Company, Rochester, N.Y.

[22] Filed: June 14, 1974

[21] Appl. No.: 479,382

[52] U.S. Cl. .................................................. 354/17
[51] Int. Cl.² ........................................ G03B 17/08
[58] Field of Search ............ 178/7, 6; 354/5, 10, 17

[56] References Cited
UNITED STATES PATENTS 3,509,804  5/1970  Kohler ................................ 354/17

Primary Examiner—John M. Horan
Attorney, Agent, or Firm—R. L. Owens

[57] ABSTRACT

Apparatus is disclosed for use with image forming apparatus having a pair of galvanometers one of which, in response to a ramp signal rotates a mirror which scans lines in one direction across the image and the other of which in response to a staircase signal rotates another mirror in a direction perpendicular to the direction of the lines to scan successive ones of the lines. The apparatus includes circuits responsive to the galvanometer drive signal amplitudes for producing a compensating signal which is representative of the angular displacement of the mirrors and thus of the position to which the beam is scanned at any instant. This compensating signal and the signal which drives the galvanometer which scans the beam between successive lines are combined to adjust the angular displacement of the mirror which scans the beam in the direction between the successive lines, thus correcting the geometric distortion of the pin cushion type of the image.

6 Claims, 3 Drawing Figures

DISTORTION CORRECTION APPARATUS FOR ELECTRO-OPTICAL REFLECTORS WHICH SCAN BEAMS TO PRODUCE IMAGES

CROSS-REFERENCE TO RELATED APPLICATIONS

Reference is hereby made to commonly-assigned copending U.S. patent application Ser. No. 444,083, entitled, A LINEARIZING CIRCUIT FOR USE IN SCAN APPARATUS HAVING A GALVANOMETER DRIVEN MIRROR, filed Feb. 20, 1974, in the name of J. E. Newton et al., and to the copending U.S. patent applications which are referenced therein all of which are assigned to the same assignee as the present application.

BCKGROUND OF THE INVENTION

1. Field of the Invention

The present invention relates to apparatus for correcting distortion in images scanned by electro-optical reflectors and particularly to apparatus for correcting distortion in a pattern form by scanning light beams in two directions with mirrors which are rotated by galvanometers.

The invention is especially suitable for use in computer output microfilmers (COM) wherein successive lines of alphanumeric characters are scanned across a film to record a page of computer output data. The invention is generally applicable for use in mirror scanning apparatus wherein beams of light are reflected off rotating mirrors for providing images with a high degree of accuracy and resolution.

2. Description of the Prior Art

In computer output microfilmers, computer data can be converted into light beams which are scanned on to a film for recording the alphanumeric characters which are represented by the computer data. It has been found desirable to use a mirror which is rotated by a galvanometer for scanning the light beams to write a line of characters on the film. Successive lines may be written by advancing the film. However, in the interest of increased writing speed and accuracy, it is desirable to use a second galvanometer rotated mirror to scan the beams in a direction perpendicular to the direction of the lines; thus permitting a complete page of computer output data to be written, say in one frame of the film.

Inasmuch as it is necessary to record pages of very small size in the course of microfilming operations, it is necessary to eliminate any distortion. When the mirrors are rotated, however, the distance between the film and the effective center of rotation of the beams changes as the beams are scanned across the successive lines. There is a conical planar intercept of the beam in the film plane that results in a hyperbolic scan path, rather than a linear path along each of the successive lines. The resulting distortion manifests itself as a bowing of the lines which may be more pronounced at the top or bottom of the page depending upon the initial angle of the mirror which scans in the page direction with respect to the source of the light beam and the film. This distortion may be termed "pin cushion distortion."

In certain cathode ray tube apparatus, pin cushion correction circuits have been provided for controlling deflection of the electron beam (see U.S. Pat. Nos. 3,482,255; 3,566,181; and 3,649,870). Scanning apparatus using electro-optical reflectors such as galvanometer mirrors for scanning light beams do not provide control signals which are directly related to the distortion and thus cathode ray tube correction circuits are not applicable for correcting distortion in images scanned by electro-optical reflectors. Other schemes for correcting distortion have involved the use of special correcting lenses (see U.S. Pat. No. 3,144,511), diffracting apertures (see U.S. Pat. No. 3,438,050). It has also been suggested to change the repetition rate of frequency of the galvanometer drive waveforms (see U.S. Pat. No. 3,372,398). Such changes may compensate for variations in the rate at which the record medium is advanced, but will not correct for distortion of the type mentioned above which results when individual lines are successively scanned.

SUMMARY OF THE INVENTION

It is therefore an object of the present invention to provide improved distortion correction apparatus by means of which distortion of images formed by electro-optical scanning of light beams is reduced.

It is another object of the present invention to provide an improved computer output microfilmer in which distortion of filmed images is reduced.

It is a further object of the present invention to provide improved scanning apparatus using electro-optical reflectors in which distortion, introduced by optical relationships of the reflectors, light source and image plane, is reduced.

It is a still further object of the present invention to provide improved display apparatus using galvanometer operated optical scanning elements to produce the display in which the distortion due to optical relationships of the elements is reduced.

It is a still further object of the present invention to provide improved scan apparatus having galvanometer driven mirrors in which geometric distortion is compensated.

It is a still further object of the present invention to provide an improved electrical apparatus for galvanometer driven mirrors which compensates for geometric distortion in the course of optical scanning of a two-dimensional image plane to produce a pattern in that plane.

It is a still further object of the present invention to provide improved circuitry for galvanometer operated scanning mirrors of a computer output microfilmer which compensates for optical distortion of a geometric nature (e.g., of the pin cushion type) in the image produced as the mirrors are scanned.

Briefly described apparatus for correcting distortion in images produced by a beam of radiant energy which is scanned by a pair of reflectors upon which the beam is incident, which is provided in accordance with this invention includes means, such as an electromechanical device operated by an electrical signal, for controlling the angular displacement of a first of the reflectors. The electrical signal is modified by means responsive to the angular displacements of both of the reflectors so as to correct the distortion. The modification of the signal may be effected by a compensation signal generator which responds to the angular displacement of both of the reflectors in a manner to generate a compensation signal which is proportional to the displacement of the beam in each of two directions which are perpendicular to eachother. The compensation signal is combined with the signal which controls the angular displacement of the first reflector and causes an adjustment in the distance over which the beam is scanned thereby reducing the distortion.

The foregoing and other objects and advantages of the present invention will become more apparent from a reading of the following description of the preferred embodiment of the invention which is set forth hereinafter and shown in the accompanying drawings.

BRIEF DESCRIPTION OF THE DRAWINGS each other.

DESCRIPTION OF THE PREFERRED EMBODIMENT

Figure 1:
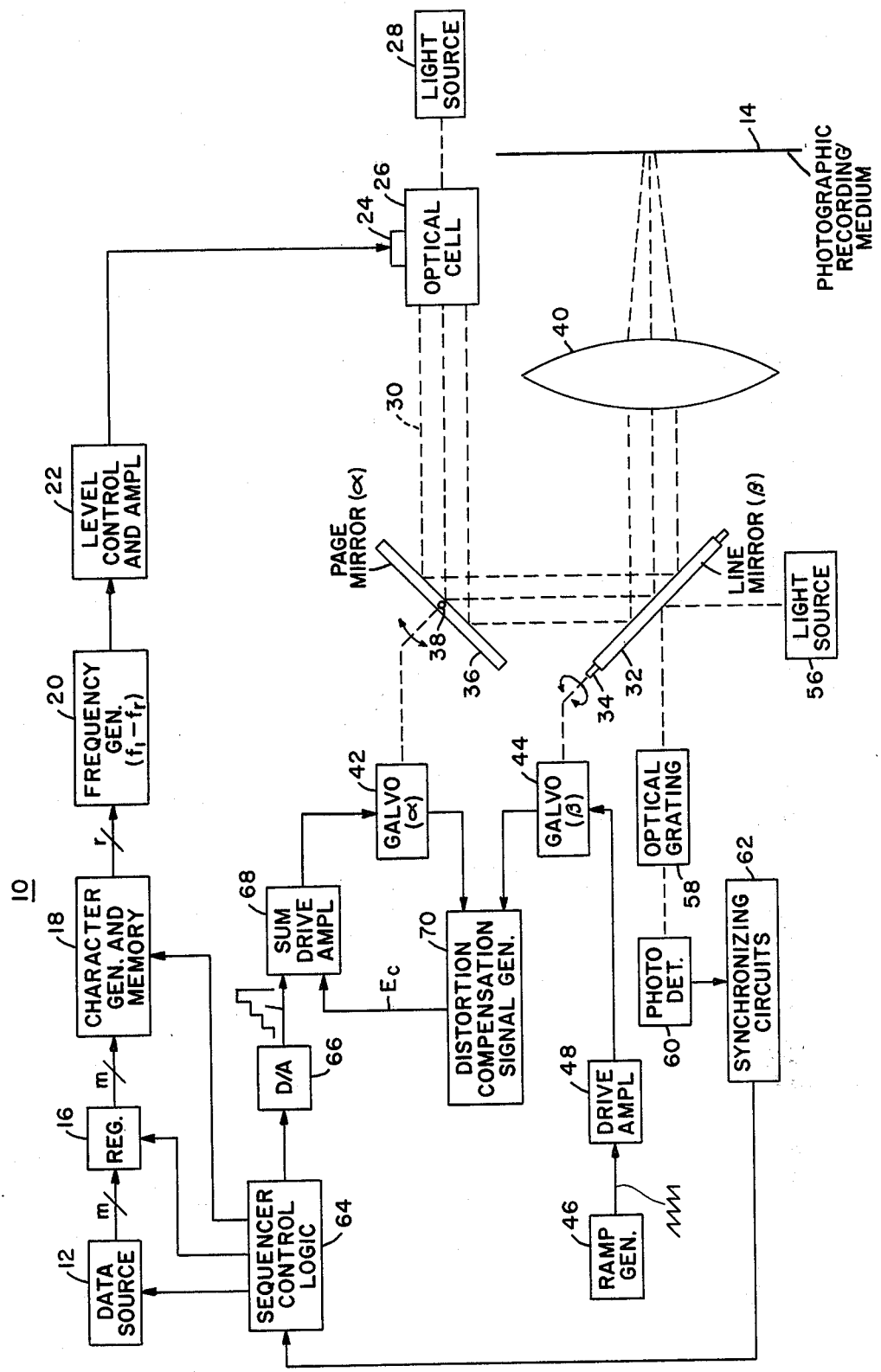
FIG. 1 is a block diagram of a computer output microfilmer which embodies the invention.

Referring now to FIG. 1, there is shown a computer output microfilmer (COM) 10 which produces microfilm records of information from a data source 12 on a photographic recording medium 14. The COM 10 may be operated on line, in which case the data source 12 may be a computer, such as an IBM 360/370 system which is equipped with interface circuitry for coupling the computer to the COM. Reference may be had to the following U.S. patents for further information respecting suitable interface circuitry: U.S. Pat. Nos. 3,303,476; 3,336,582; and 3,337,610. The COM may also be operated off line in which case the data source 12 may be a maganetic tape station which provides data to the COM through a suitable interface. The recording medium 14 may suitably be a photothermographic material which is sensitive to laser light and which may be processed on a drum-type conductive heat processor, say at temperatures in the range from about 80°C to 170°C and for processing time, say from about 2 seconds to about 15 seconds. Exemplary photothermographic materials which may be used in the recording medium 14 are described in the following U.S. Pat. Nos.: 3,506,444; 3,457,075; and 3,672,904.

Information from the data source 12 may represent alphanumeric characters by a data word or byte having $m$ data bits. $m$ may suitably be eight. These bits may be stored in a buffer register 16 and are applied one word at a time to a character generator 18 which has memory for storing the bits for a sufficient period of time until the character which they represent is recorded on the recording medium 14. The character generator 18 may be a code converter which converts the $m$ bit word into a sequence of $r$ bit words, each of the $r$ bits representing a different dot element of a column of dots in a sequence of columns which form the character. $r$ may suitably be nine and there may suitably be seven columns in the sequence which form each character. Between characters there may be three column spaces, thus in this example there would be 10 column spaces assigned to each character.

The $r$ outputs from the character generator operate a frequency generator 20 capable of producing a complex output signal having any (one or more) of $r$ discrete frequencies $f_1$ to $f_r$. The frequency generator may contain $r$ oscillators which are individually gated either on or off under the control of the character generator 18. The oscillators may be free running and may be connected to the output circuit of the generator by switches (e.g., electronic switches such as analog gates). The output circuit of the generator may consist of a resistive summing network to which each of the switches is connected and which additively combine the oscillator outputs. The frequencies $f_1$ to $f_r$ may be in the range from 31 to 49 MHz. The complex signal from the generator 20 is applied by way of level control and amplifier circuits 22 to a transducer 24 which operates an optical beam forming cell 26.

The cell 26 is suitably an acousto-optic cell through which acoustic waves corresponding to the signal applied to the transducer 24 are propagated. The cell 26 forms light, which may be suitably provided by a laser light source 28, into a plurality of beams. A distinct first order beam of light 30 is provided for every frequency present in the complex signal applied to the transducer 24. The angular position of the beams is a function of the frequency of the complex signal corresponding thereto. The position of the beam can be adjusted by changing the frequency $f_1$ to $f_r$ which corresponds thereto. A number of light beams is therefore produced simultaneously and each beam corresponds to a different element in each vertical character column. An example of a suitable acousto-optic cell 26 is the model M 40 R manufactured by the Zenith Corportion of Chicago, Ill. Reference may be had to an article by Robert Adler which appeared in the IEEE Spectrum Magazine for May 1967, Pages 42 through 54, entitled, "Interaction Of Light And Sound," for further information respecting the operation of the cell 26.

The column of light beams is scanned in a horizontal direction to write lines of characters across the recording medium by a reflector provided by a scanning mirror 32 which is mounted for rotation about an axis 34. Successive lines are recorded on the medium 14 by scanning the row of beams 30 in a vertical direction (viz, between successive lines) by means of another reflector which is shown as a scanning mirror 36. The mirror 36 is mounted for rotation about an axis 38. The direction of the lines which are scanned on medium 14 is perpendicular to the direction between successive lines. A plurality of successive lines make up a page. The mirror 32 which scans the line is therefore referred to as a line mirror, while the mirror 36 which scans the direction between the lines is referred to as a page mirror.

Each page may be a single frame. Between each frame the recording medium may be repositioned to generate fiche (not shown) or advanced by reeling devices (not shown). The light beams which diverge from the optical cell 26 may be focused to pass through a slit (not shown); thus eliminating all but the first order refracted light. The light beams may be focused again by lens 40 to produce the image on a photographic recording medium 14. The page mirror 36 is rotated about its axis 38 by a galvanometer 42 which is mechanically coupled thereto. A similar galvanometer 44 is mechanically coupled to the line mirror 32 to rotate it about its axis 34. Reference may be had to U.S. Pat. No. 3,624,574 for further information respecting galvanometers suitable for rotating the scanning mirrors 32 and 36. Each galvanometer has a coil through which drive current is passed. The angular displacement of the page mirror 36 is indicated as alpha ($\alpha$), while the angular displacement of the line mirror 32 is indicated as beta ($\beta$).

Figure 2:
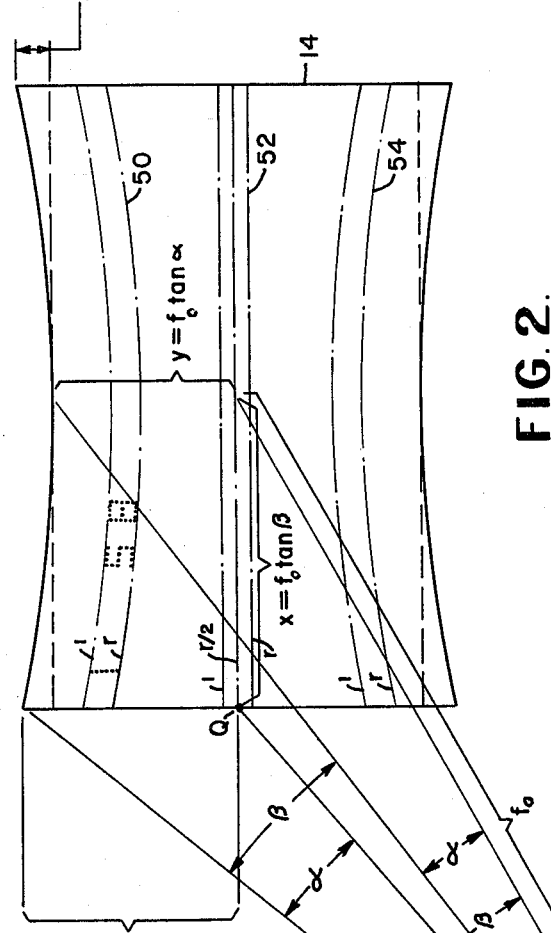
FIG. 2 is a simplified optical diagram illustrating the distortion produced by the galvanometer mirrors illustrated in FIG. 1 which distortion is corrected in accordance with the invention.

The line galvanometer 44 is desirably driven continuously back and forth or nutated while the COM is in a writing mode. To this end a ramp generator 46 produces a sawtooth waveform which is amplified in a drive amplifier 48. A line of character information can be recorded in a single scan of the line mirror 32. Between line scans the page mirror 36 steps the beam to the next or successive line. Three exemplary lines 50, 52 and 54 are illustrated in FIG. 2. Each light beam is at a particular height position in a vertical character column and corresponds to one of the frequencies $f_1$ to $f_r$ which is generated in the frequency generator 20 and applied to the cell 26. Each beam is independently controlled to be on or off, i.e., to illuminate or leave dark corresponding individual light elements. The $r$ character elements, vertical columns of which are written on the recording medium 14 to form alphanumeric characters, are shown in FIG. 2. The numerals 5 and 8 being shown in line 50 by way of example.

The character generator and memory 18 determines whether or not a particular element will be written. The character generator 18, the transfer of data thereto from the data source 12 and the register 16 and the generation of frequencies by the frequency generator 20 are all synchronized to the position of the line mirror 32. The synchronization apparatus is more fully described in the above-referenced J. E. Newton et al. application. Briefly, the line mirror 32 has a mirrored or reflecting rear surface. A light source 56 produces a narrow beam of light which illuminates the rear surface of the mirror 32. As the mirror 32 nutates, the beam from the source 56 is scanned across an optical grating 58. The grating may suitably have a succession of rulings or bars with a ratio which may be one for each character. A larger bar may be provided to indicate the beginning of each line of characters. A photodetector 60 provides an electrical output when the beam from the source 56 is focused on a space or transparent section (between bars).

The output of the photodetector operates synchronizing circuits 62. These circuits may include a phase locked loop which is locked to the signal detected by the photodetector. The circuits 62 also detect the signal corresponding to the first character bar. The synchronizing circuits thus provide outputs corresponding to the start of each line and the characters or vertical character elements columns in each line. These outputs control a sequencer control logic circuit 64 which control the transfer of the $m$ bit data words from the data source 12 to the buffer register 16 which may take place at high rate driving line retrace. The sequencer also clocks the buffer register 16 into the character generator 18 and controls the outputting of the $r$ bits which constitute each of the vertical character element columns. The sequencer control logic may include a source of clock signals, a divider for dividing the clock signals into timing signals at rates which are submultiples of each other and gates controlled by the synchronizing circuit outputs for gating the clock and timing signals to the data source 12, the register 16 and the character generator 18. The design and construction of suitable sequencer control logic will be well understood to those skilled in the art. Reference may be had to U.S. Pat. No. 3,657,707 for information respecting the design and construction of such control logic.

The sequencer 64 may include a counter which counts each character space on the line. When a number of character spaces equal to the total number of characters per line is counted an output may be provided from this counter which is applied to a page counter and the line counter is recycled (reset to zero). The outputs from the line counter (viz, the line counts) are counted in a page counter which may count up to the number of lines on a page. The page counter, which together with the line counter may be part of the sequencer 64, is connected to a digital analog converter 66 which converts the count stored in the page counter into a staircase analog voltage. This voltage may increase as shown or decrease in steps, each step corresponding to a successive line on the page. This staircase voltage is applied to a summing and drive amplifier circuit 68 which drives the page galvanometer 42 so as to rotate the page mirror 36 in steps, each step corresponding to a successive line on the page.

In order to compensate for distortion of the lines of characters on each page, a distortion compensation signal generator 70 is provided. This generator 70 receives outputs from both the page and line galvanometers which correspond to the angular displacements of the line and page mirrors. These outputs are processed into a compensation signal $E_c$ which is additively combined (summed) with the page drive signal from the digital to analog converter 66 in the summing and drive amplifier 68. The page drive signal is thus adjusted so as to compensate for optical distortion which would otherwise manifest itself in the image or pattern scanned on the recording medium 14.

Referring to FIG. 2, there is shown the ray paths of a typical beam which scans the central one of the character elements, indicated as the $r/2$ character element. These character elements make up the lines of characters which constitute a page of microfilm output on the recording medium 14. Three of these lines 50, 52 and 54 are illustrated by way of example. There may be a large number of lines, say 64, on each page. Inasmuch as in this example a lens 40 having a focal length $f_o$ is used, the rays may be considered as emanating from a gauss point G at the center of the lens. It will be observed that the length or radial distance from the point G to the plane of the medium 14 is greater at the top and bottom of the page than in the center of the page. In other words there is a conical planar intercept of the light beam in the film plane that results in a hyperbolic scan path. The beam is scanned in the line or $x$ direction a distance equal to $f_o \tan \beta$, where $\beta$ is twice the angular displacement of the line mirror 32. Along the vertical center line of the page, the angular displacement in the page direction, $y$, is equal to $f_o \tan \alpha$, where $\alpha$ is twice the angular displacement of the page mirror 36. However, $y$ is not constant or even linear with respect to the scan in the $x$ or line direction and an error in the distance over which the beam is scanned equal to $\Delta y$ results.

It will be observed from the geometrical relationships that the total displacement in the $y$ or page direction, or $y + \Delta y$, is a function of both the angular displacement $\alpha$ of the page mirror and the angular displacement $\beta$ of the line mirror and is equal to $f_o \tan \alpha / \cos \beta$. By applying geometrical relationships it can be shown that $\Delta y$ is exactly equal to $f_o \tan \alpha \, (\sqrt{\tan^2 \beta + 1} - 1)$. For small angles (viz, $\alpha$ and $\beta$ less than 10°) the error $\Delta y$ is approximately equal to $f_o/2 \tan \alpha \tan^2 \beta$. Accordingly, by correcting the page scan so as to compensate for the error $\Delta y$, the distortion can be corrected. It will be noted that the correction is a function, not only of the angular displacement in the page direction, but also of the angular displacement in the line direction.

Figure 3:
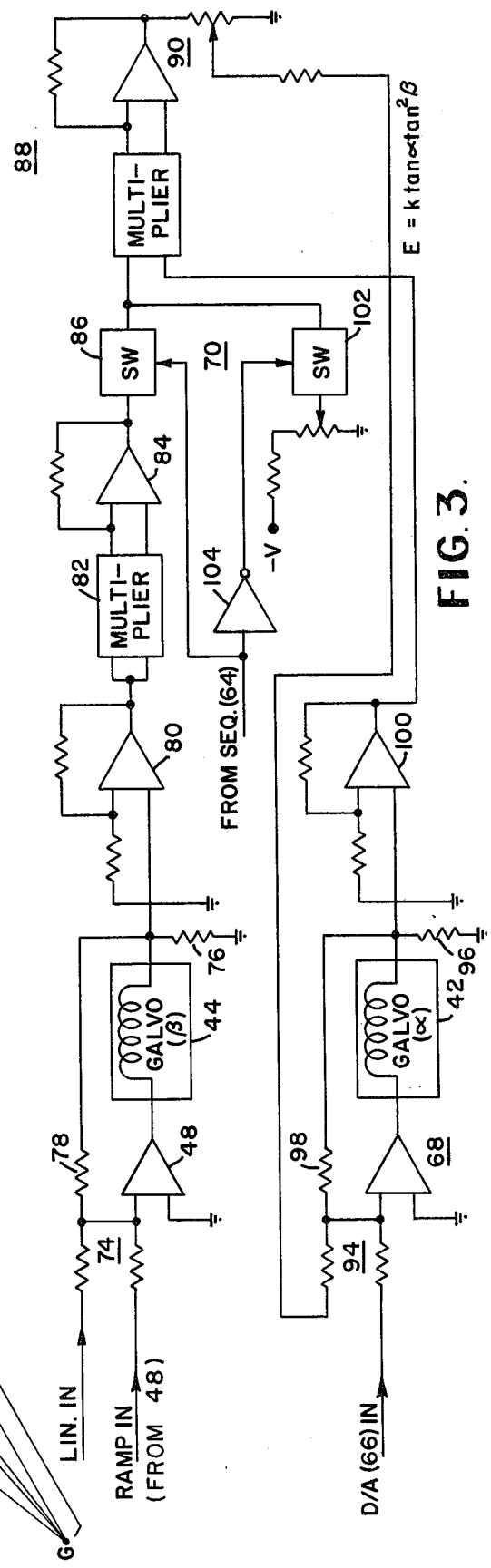
FIG. 3 is a more detailed diagram partially in block and partially in schematic form which illustrates the distortion compensation signal generator shown in FIG. 1.

Referring to FIG. 3, the circuitry for generating the compensation signal as well as for operating the galvanometers 42 and 44 so as to correct the distortion is shown. The ramp input from the ramp generator 46 is applied to the drive amplifier, 48 for the line galvanometer 44. Circuitry to accomplish rapid retrace via a step function is not shown. A summing circuit in the form of a resistor network 74 is connected to an input of an operational amplifier 48 which with power booster circuitry (not shown) provides the galvanometer drive amplifier. In addition to the ramp input, a scan rate linearity correction input may also be applied to the drive amplifier 48. Circuitry for generating this linearity input is described in the above-mentioned Newton et al. application. The output of the amplifier 48 is a current which flows to the coil of the galvanometer 44.

Since the galvanometer is in effect a direct current motor, the angular displacement of the line mirror is proportional to the current through the galvanometer. This current flows through a small current sensing resistor 76. The voltage developed is fed back by way of a feedback resistor 78 to the input of the drive amplifier 48 for stabilizing purposes.

The current output detected across the resistor 76 is buffered by an operational amplifier 80 which is connected to present high input impedance. The output of this amplifier 80 is connected to both the multiplier and multiplicand inputs of a multiplier circuit 82. The multiplier 82 may be an integrated circuit type analog multiplier, the circuit sold by Motorola, their Part MC 1495 being suitable. The multiplier output is buffered similar to amplifier 80 by operational amplifier 84. The operational amplifiers 80 and 84 (as well as 48, 68, 90, 100 and 104) may also be integrated circuits, Motorola Part MC 1458 being suitable. The multiplier 82 and the amplifier 84 together forming an analog multiplier circuit.

The output of the multiplier is connected through the analog switch 86 to the multiplier input of a second analog multiplier circuit 88. The circuit 88 similarly with the analog multiplier just described may suitably consist of a multiplier integrated circuit followed by an operational amplifier integrated circuit. The product output of the multiplier 88 is connected to a potentiometer circuit 90 which adjusts the output by the factor corresponding to one-half the focal length of the lens 40, as was discussed in connection with FIG. 2 and provides the compensation signal $E_c$.

The other or multiplicand input to the second multiplier circuit 88 is obtained from the page galvanometer 42. The staircase waveform from the digital to analog converter 66 is controlled by the sequencer 64. The summing and drive amplifier 68 is shown as an operational amplifier having a summing circuit consisting of a resistor network 94. This network receives the compensating signal, $E_c$, from the potentiometer 90, as well as the staircase waveform, and provides a compensated drive current to the coil of the page galvanometer 42. This drive current flows through a resistor 96. The current is proportional to the angular displacement of the page scanning mirror 36. The current is also fed back by way of a resistor 98 for stabilizing the galvanometer drive current. A buffer amplifier 100, similar to the amplifier 80, converts the galvanometer current into a voltage and provides the multiplier input to the analog multiplier circuit 88.

It will therefore be seen that the multiplier 82 provides an output proportional to the square of the line galvanometer current while the multiplier 88 provides an output proportional to the product of the square of the line multiplier output current and the page galvanometer output current. Since these currents are proportional to the distance over which the beam is scanned in the line and page direction, the resulting compensating voltage $E_c$ is proportional to the product of the tangent of the angular displacement of the page galvanometer, $\alpha$, and the tangent squared of the angular displacement of the line galvanometer $\beta$. The potentiometer 90 inserts a constant corresponding to one-half of the focal length of the lens. This constant is indicated as $k$ in the equation expressing the above relationship which is shown in FIG. 3.

A circuit for applying a steady state signal to the page galvanometer 42 during retrace (and page step) consists of an analog switch 102 and an inverter 104. The page step signal from the sequencer 64 is applied to thw switch 86 for disconnecting the output of the squaring multiplier 82, 84 from the second multiplier 88 and applying a constant low level negative voltage to the multiplier input of the second multiplier 88 in lieu of the first multiplier output (viz, in lieu of the page galvanometer input thereto). This steady voltage serves to apply a signal level during line retrace (and page step) adjusted for minimum overshoot and ring of the page galvanometer 42. The analog switches 86 and 102 may be provided by separate switch channels of an integrated circuit analog switch, integrated circuit type DG 200 manufactured by Siliconix, being suitable.

From the foregoing description, it will be apparent that there has been provided improved distortion correction apparatus which is especially suitable for use in correcting distortion of patterns scanned by galvanometer mirrors in a computer output microfilmer. While scanning apparatus using separate mirrors for line and page scan are illustrated, it will be appreciated that one mirror with a gimbal mechanism for angularly rotating the mirror in mutually perpendicular directions may be used. Other variations and modifications within the scope of the invention will undoubtedly suggest themselves to those skilled in the art. Accordingly, the foregoing description should be taken merely as illustrative and not in any limiting sense.

I claim:

1. For use in computer output microfilmer apparatus or the like for recording characters derived from a data source on a light sensitive medium, said apparatus comprising frequency generator means for producing a complex signal having a plurality of different frequencies, character generator means for operating said generator means to produce any of said different frequencies, a simultaneous multi-beam acousto-optic cell adapted to receive a beam of light and responsive to said complex signal for simultaneously forming a number of light beams each corresponding to a different frequency thereof, a first mirror and a second mirror for scanning said beams in a first direction and in a second direction perpendicular to said first direction to form a pattern of successive lines on said medium on which said characters are recorded, said first direction being along said lines and second directions being between the topmost and bottom-most of said lines so that a page of said lines can be recorded, a lens for focusing said beams to obtain the size of said page to predetermined size, and first and second current driven galvanometers for rotating said first and second mirrors, the improvement comprising:
  a. a signal generator responsive to the current which drives said first galvanometer and the current which drives said second galvanometer for generating a compensating signal corresponding to the position of said beams on said page; and
  b. means for modifying the current which drives said second galvanometer in accordance with said compensating signal to effect correction for pin cushion distortion in said pattern on said page.

2. The invention as set forth in claim 1 wherein said signal generator includes: (1) a first multiplier responsive to a signal corresponding to said first galvanometer drive current for providing an output corresponding to the square thereof; and (2) a second multiplier responsive to said last-named output and to a signal corresponding to said second galvanometer drive current.

3. The invention as set forth in claim 2 wherein said signal generator includes a signal amplitude control circuit connected to the output of said second multiplier for adjusting the amplitude thereof in accordance with the focal length of said lens.

4. The invention as set forth in claim 1 further comprising means for generating a ramp signal for providing said first galvanometer drive current,
  means for generating a step signal, each step of which corresponding to a successive line on said page, and
  means for summing said compensating signal with said step signal for providing said second galvanometer drive current.

5. The invention as set forth in claim 4 including resistors connected in series with said galvanometers,
  a first multiplier having a multiplier input and a multiplicand input, both connected to the one of said resistors which is connected to said first galvanometer,
  a second multiplier having a multiplier input and a multiplicand input, one connected to the one of said resistors which is connected to said second galvanometer and the other connected to the product input of said first-named multiplier, and
  means for connecting the product output of said second multiplier to said summing means.

6. The invention as set forth in claim 5 including means for simultaneously disconnecting said first multiplier product output from said second multiplier and instead applying a constant level signal thereto of amplitude sufficient to deflect said beam off said page during the interval between each of said successive line scans.

* * * * *